United States Patent
Herrera et al.

[19]

[11] Patent Number: 6,155,590
[45] Date of Patent: Dec. 5, 2000

[54] HITCHBALL SECURING DEVICE

[75] Inventors: Richard Herrera, Chandler; Robert Wesson, Phoenix, both of Ariz.

[73] Assignee: U-Haul International, Inc., Phoenix, Ariz.

[21] Appl. No.: 09/206,453

[22] Filed: Dec. 7, 1998

[51] Int. Cl.[7] .................................................. B60D 1/173
[52] U.S. Cl. ......................................... 280/511; 280/504
[58] Field of Search .................................... 280/511, 507, 280/504; 81/119, 125.1, 125

[56] References Cited

U.S. PATENT DOCUMENTS

| 166,514 | 6/1875 | Dunn ........................................ 81/177.6 |
| 922,258 | 5/1909 | Caven ...................................... 81/176.2 |
| 974,107 | 11/1910 | Armstead .................................. 81/119 |
| 1,422,402 | 7/1922 | White et al. ............................... 81/119 |
| 1,505,567 | 8/1924 | Kelley ....................................... 81/119 |
| 1,732,804 | 10/1929 | Chicoine et al. .......................... 294/15 |
| 2,200,453 | 5/1940 | Lizakowski ................................. 7/138 |
| 2,640,382 | 6/1953 | Grossman .................................. 81/119 |
| 4,938,496 | 7/1990 | Thomas et al. ........................... 280/511 |
| 5,085,452 | 2/1992 | Janeiro ..................................... 280/511 |
| 5,575,494 | 11/1996 | DeVries .................................... 280/507 |

*Primary Examiner*—Kevin Hurley
*Assistant Examiner*—Andrew J. Fischer
*Attorney, Agent, or Firm*—Jeffer, Mangels, Butler & Marmaro LLP

[57] ABSTRACT

A tool includes opposed drawbar engaging surfaces and opposed ball flat engaging surfaces. The tool is provided for use with a draw-bar assembly including a draw-bar having an end with a hole defined therethrough and a surface, and a hitchball having opposed ball flats and a shank extending therefrom. When the tool is engaged with the end of the draw-bar the opposed draw-bar engaging surfaces are adjacent the end and the opposed ball flat engaging surfaces are adjacent the opposed ball flats.

9 Claims, 3 Drawing Sheets

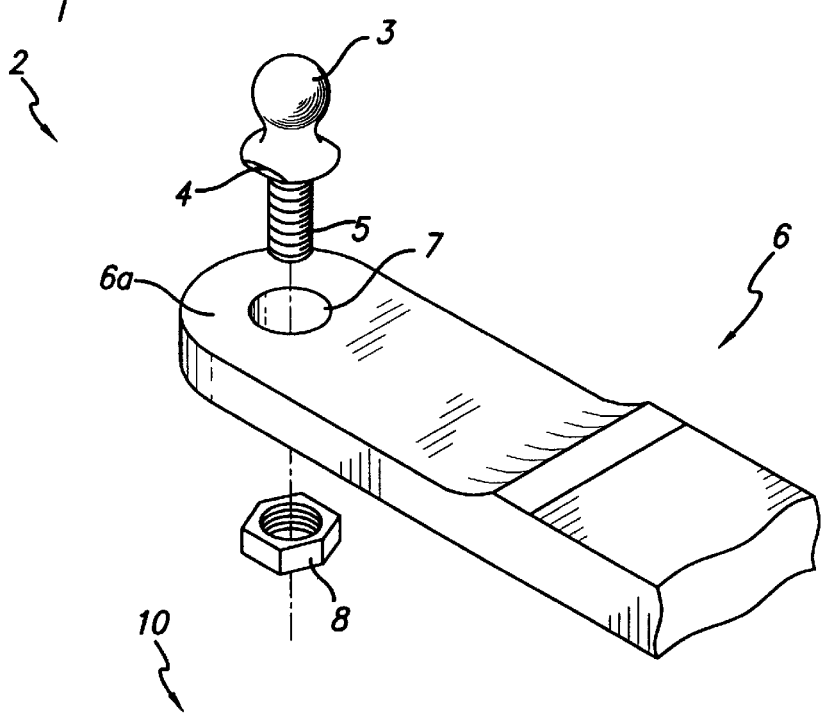
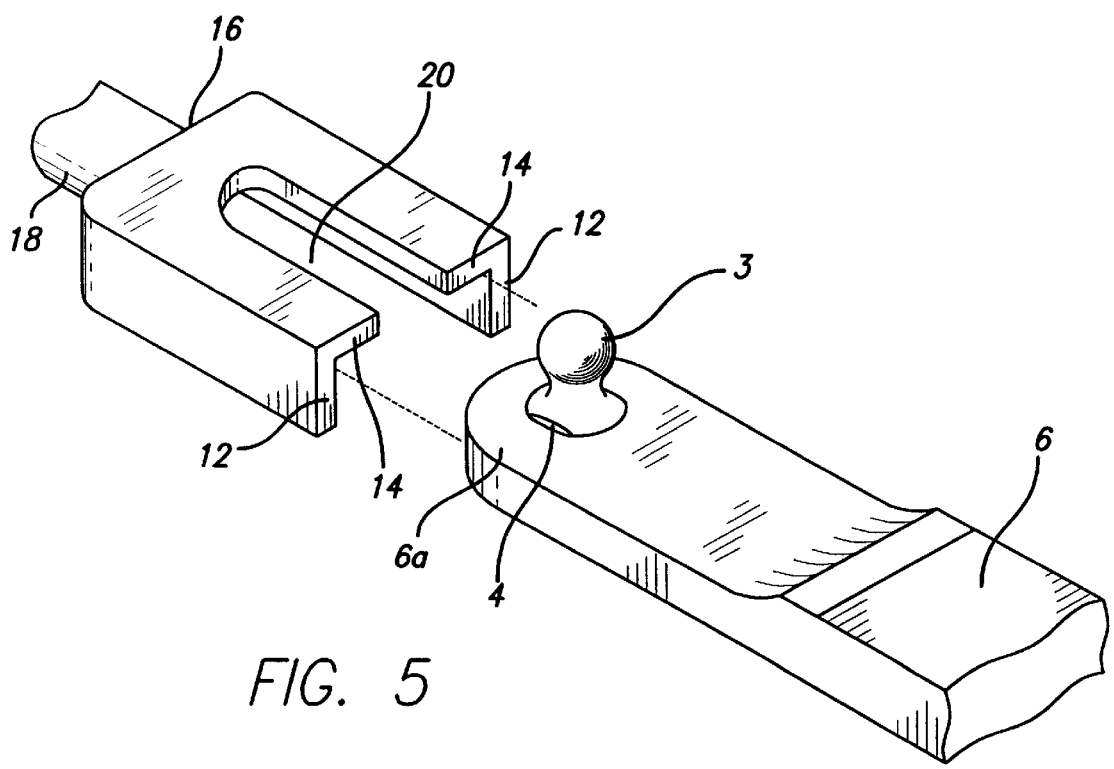

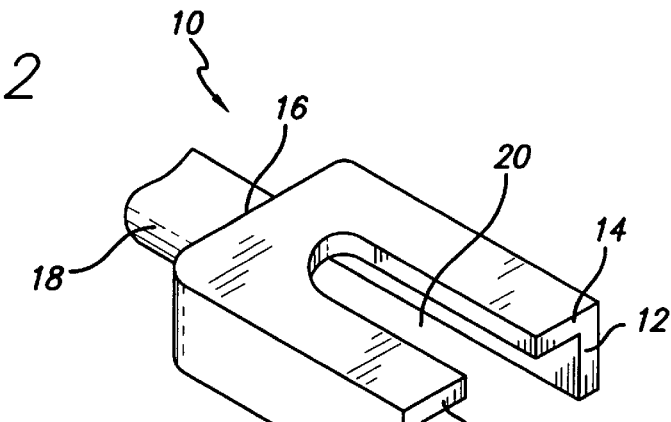
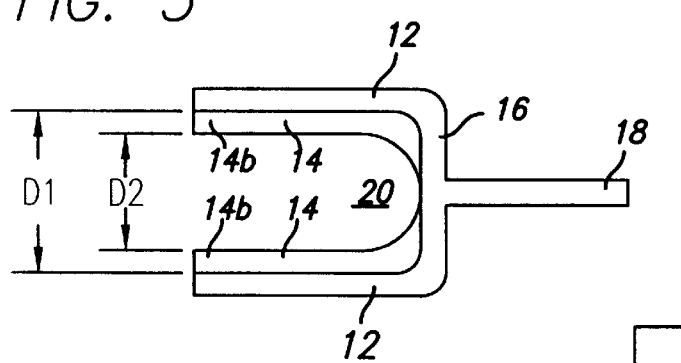
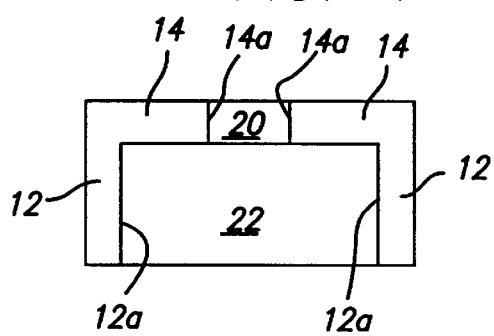
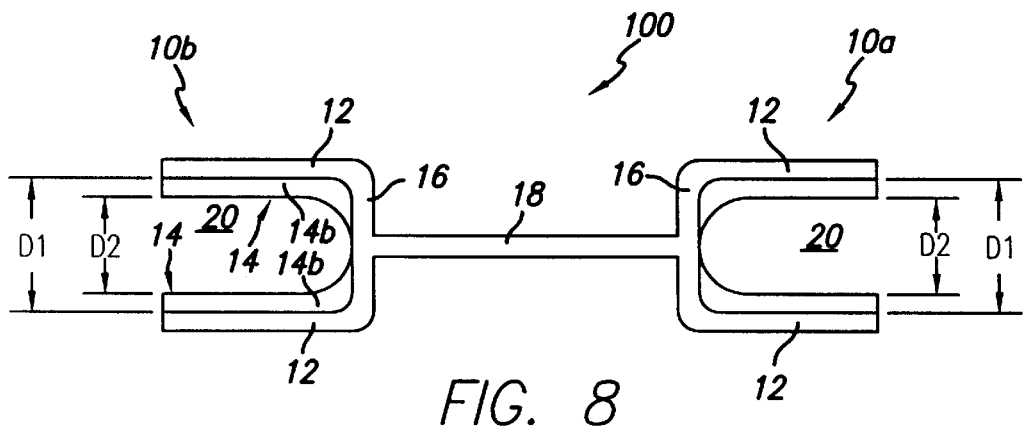

HITCHBALL SECURING DEVICE

FIELD OF THE INVENTION

The present invention relates to a device for holding a hitchball in fixed rotational position while the hitchball shank nut is tightened.

BACKGROUND OF THE INVENTION

A draw-bar assembly is often provided on a vehicle for towing trailers and the like. A conventional draw-bar assembly, generally known as a hitch, includes a draw-bar and a coupling device, such as a hitchball. With reference to FIG. 1, hitch 2 generally includes a hitchball 3 having a pair of opposed ball flats 4 and a shank 5 extending therefrom, and a draw-bar 6, having at one end 6a a hole 7 defined therethrough and the other end extending from the vehicle. To assemble hitch 2, shank 5 is inserted into hole 7 and a nut 8 is threaded onto the portion of shank 5 that extends through hole 7. To sufficiently tighten nut 8 a relatively high amount of torque is required. Typically, the installer must use two wrenches simultaneously to accomplish proper tightening. One wrench is used to tighten nut 8 and a second wrench is engaged with the opposed ball flats 4 to hold hitchball 3 in fixed rotational position. Such an operation is difficult for one person to perform, and often cannot be done by a single person.

SUMMARY OF THE PREFERRED EMBODIMENTS

In accordance with one aspect of the present invention there is provided a tool that includes opposed drawbar engaging surfaces and opposed ball flat engaging surfaces. The tool is provided for use with a hitch including a draw-bar having an end with a hole defined therethrough and a surface, and a hitchball having opposed ball flats and a shank extending therefrom. When the tool is engaged with the end of the draw-bar the opposed draw-bar engaging surfaces are adjacent the end and the opposed ball flat engaging surfaces are adjacent the opposed ball flats.

In a preferred embodiment the device includes a pair of opposed side walls each having an inwardly directed flange extending therefrom and a connection member connecting the pair of opposed side walls. Each of the inwardly directed flanges comprises one of the opposed ball flat engaging surfaces, and each of the pair of opposed side walls comprises one of the opposed draw-bar engaging surfaces.

In accordance with yet another aspect of the present invention there is provided a device for holding a hitchball in fixed rotational position relative to a draw-bar. The device includes an elongated handle having first and second opposite ends and a pair of tools as described above disposed at both ends of the handle.

In accordance with another aspect of the present invention there is provided a method of assembling a draw-bar assembly including the steps of engaging a tool as described above with the hitchball and the draw-bar and threadedly engaging the nut with the shank. The tool holds the hitchball in fixed rotational position relative to the draw-bar.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is an exploded perspective of a conventional draw-bar assembly.

FIG. 2 is a perspective view of a device for holding a hitchball in accordance with a first embodiment of the present invention.

FIG. 3 is a bottom plan view of the device of FIG. 2.

FIG. 4 is a front elevation of the device of FIG. 2.

FIG. 5 is an exploded perspective of the device of FIG. 2 and a draw-bar assembly.

FIG. 8 is a bottom plan view of a device for holding a hitchball having two ends designed to fit different sized hitchballs in accordance with a second embodiment of the present invention.

Like numerals refer to like parts throughout the several views of the drawings.

DETAILED DESCRIPTION OF THE PREFERRED EMBODIMENTS

Figure 6:
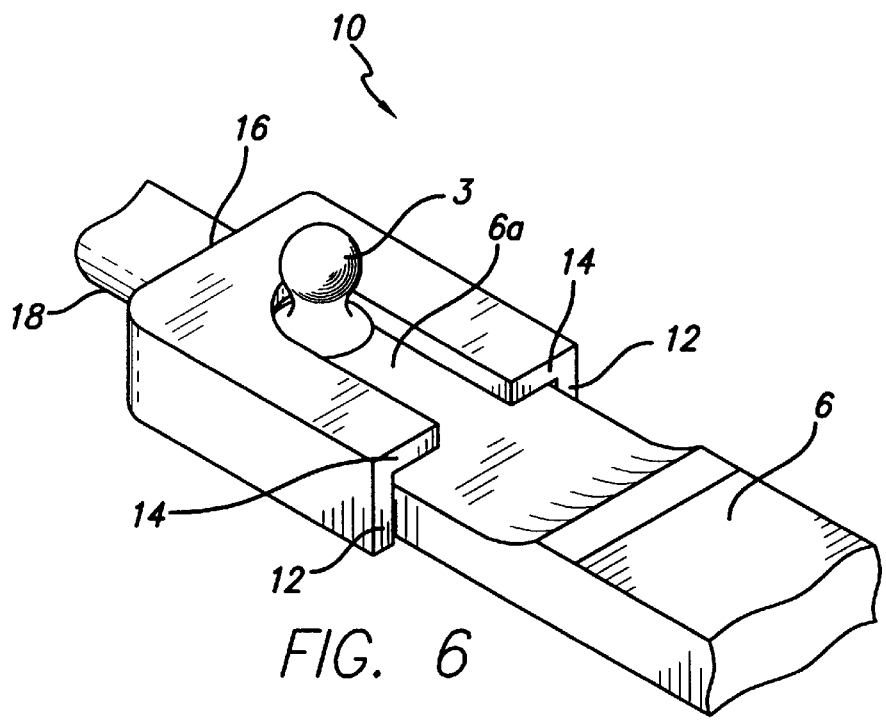
FIG. 6 is a perspective view of the device of FIG. 2 engaged with a draw-bar assembly.

Referring to FIGS. 1–3, a first embodiment of a tool 10 for preventing rotational movement of a hitchball 3 during tightening of hitchball shank nut 8 is shown. Tool 10 generally includes a pair of opposed side walls 12, a pair of flanges 14, a connection member 16 and a handle 18.

It will be appreciated that terms such as "rearwardly" and "downwardly" used hereinbelow are merely for ease of description and refer to the orientation of the components as shown in the Figures. It should be understood that any orientation of tool 10 described herein is within the scope of the present invention.

A conventional draw-bar assembly 2 is described above and is well known in the art. During assembly of draw-bar assembly 2, when tightening the hitchball shank nut 8 by imparting a torque thereto, the friction between the threads of nut 8 and the threads of shank 5 often cause the entire hitchball 3 and shank 5 to rotate within hole 7. To prevent this rotation, it is necessary to engage hitchball 3 and/or shank 5 with a sufficient force so as to overcome the friction between the threads of nut 8 and the threads of shank 5, thereby allowing nut 8 to be tightened while holding hitchball 3 in fixed rotational position relative to draw-bar 6.

Each side wall 12 includes a draw-bar engaging surface 12a having a terminal end 12b. Preferably, the pair of opposing side walls 12 are held in spaced relation by connection member 16 thereby defining a first distance D1 therebetween. Preferably, the side walls 12 are held in parallel spaced relation. It will be appreciated that D1 is advantageously selected to allow a draw-bar 6 to slide longitudinally therebetween. Connection member 16 extends between the two side walls 12 as shown in FIG. 3, preferably from the rear edges thereof. The configuration of connection member 16 is not a limitation on the present invention. Any connection member that holds the side walls 12 in spaced relation is within the scope of the present invention.

The flanges 14 each extend inwardly from the two side walls 12, respectively. Preferably, the flanges 14 extend from the upper edge of the side walls 12, as shown in the Figures, however this is not a limitation on the present invention. The flanges 14 define a slot 20 therebetween having a width D2. Preferably, D2 is advantageously selected so as to allow the opposed ball flats of a hitchball to fit therebetween. The flanges 14 each have a ball flat engaging surface 14a having a terminal end 14b. Preferably, the ball flat engaging surfaces 14a are parallel to one another.

In a preferred embodiment, a cylindrical handle 18 extends rearwardly from connection member 16. However, any handle or gripping means is within the scope of the present invention. Alternatively, the handle can be omitted.

The elements of tool 10 (the side walls 12, the flanges 14, connection member 16 and handle 18) preferably are comprised of a rigid material, such as steel, aluminum or high strength molded plastic. Also, tool 10 can be formed as one continuous piece, or two or more separate elements can be attached to one another by a conventional attachment method such as welding or the like.

Figure 7:
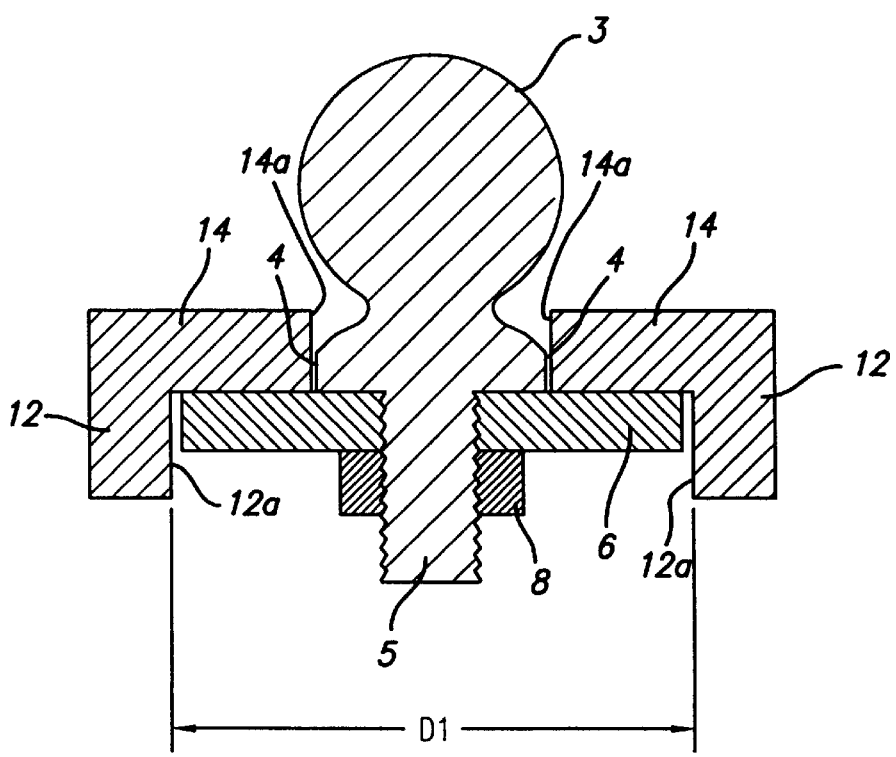
FIG. 7 is a sectional elevation taken along line 7—7 of FIG. 6 showing the device of FIG. 2 engaged with a draw-bar assembly.

Referring to FIGS. 4–6, in operation, handle 18 is grasped by the operator and the tool 10 is engaged with end 6a of draw-bar 6 and hitchball 3. Hitchball 3 is received in slot 20, such that the opposed draw-bar engaging surfaces 12a of the side walls 12 are adjacent and adapted to engage draw-bar 6, the opposed ball flat engaging surfaces 14a of the flanges 14 are adjacent and adapted to engage the opposed ball flats 4 of hitchball 3, and the bottom surfaces 14b of the flanges 14 rests on draw-bar 6, as shown in FIG. 7. Nut 8 is typically tightened with a wrench or the like. As described above, the imparting of a torque on nut 8 will bias the entire hitch ball 3 and shank 5 to rotate within hole 7. As hitchball 3 begins to rotate, the opposed ball flats 4 contact the opposed ball flat engaging surfaces 14a of the flanges 14. This, in combination with the contact of draw-bar 6 with the draw-bar engaging surfaces 12a of the side walls 12 prevents hitchball 3 and shank 5 from rotating, thereby allowing nut 8 to be threadedly engaged with shank 5 as desired. The operator can then leave device 10 in position, thus allowing "hands free" tightening of hitchball shank nut 8 after initial tightening.

It will be understood that tool 10 can be dimensioned to fit any type of hitchball and/or draw-bar. For example, as is known in the art, a class system exists for certain types of hitches, namely classes 1, 2, 3, 4, etc. Tool 10 can be dimensioned to fit any of these different classes of hitches.

Referring to FIG. 8, in a second embodiment of the present invention two devices 10a and 10b can be disposed at opposite ends of an elongated handle 18, thereby forming a device 100 that can be used for two different sized hitchball assemblies. Preferably, tools 10a and 10b are each dimensioned so as to fit a different size draw-bar assembly. For example, tool 10a can be dimensioned such that D1 is about 2.06" and D2 is about 1.56", thereby providing accommodation of draw-bars with a width of 2.00" and typical 1.50" width across ball flats. Tool 10b can be dimensioned such that D1 is 2.56" and D2 is about 1.56", thereby providing accommodation of draw-bars with a width of 2.50" and typical 1.50" width across ball flats. Any number of devices 10 on a single tool is within the scope of the present invention.

The embodiments of the present invention recited herein are intended to be merely exemplary and those skilled in the art will be able to make numerous modifications to them without departing from the spirit of the present invention. For example, the side walls 12 can extend downwardly at an angle, the side walls 12 may be curved. The side walls 12 can have a second flange extending inwardly from the bottom edge thereof. All such modifications are intended to be within the scope of the present invention as defined by the claims appended hereto.

What is claimed is:

1. A hitch assembly comprising:
   (a) a draw-bar assembly comprising a draw-bar having an end having a hole defined therethrough, said end having a surface, and a hitchball having opposed ball flats and a shank extending therefrom, and
   (b) a tool comprising a drawbar engaging surface and a ball flat engaging surface, whereby when said tool is engaged with said end of said draw-bar, said drawbar engaging surface is adjacent said end and said ball flat engaging surface is adjacent one of said ball flats.

2. The assembly of claim 1 wherein said tool comprises opposed drawbar engaging surfaces and opposed ball flat engaging surfaces, whereby when said tool is engaged with said end of said draw-bar, said opposed draw-bar engaging surfaces are adjacent said end and said opposed ball flat engaging surfaces are adjacent said opposed ball flats.

3. The assembly of claim 2 wherein said tool comprises:
   (a) a pair of opposed side walls each having an inwardly directed flange extending therefrom, and
      wherein each of said inwardly directed flanges comprises one of said opposed ball flat engaging surfaces, and wherein each of said pair of opposed side walls comprises one of said opposed drawbar engaging surfaces,
   (b) a connection member connecting said pair of opposed side walls.

4. The assembly of claim 3 wherein said inwardly directed flanges have an opening defined therebetween, said opening being adapted to receive said hitchball, whereby said pair of opposed ball flats are adjacent said opposed ball flat engaging surfaces, respectively.

5. The assembly of claim 3 wherein said tool further comprises a handle extending from said connection member.

6. The assembly of claim 1 wherein said hitchball and said draw-bar are engaged simultaneously by said tool.

7. A device for holding a hitchball in fixed rotational position relative to a draw-bar, said device comprising:
   (a) an elongated handle having first and second opposite ends,
   (b) a first tool of claim 1 affixed to said first end of said elongated handle, and
   (c) a second tool of claim 1 affixed to said second end of said elongated handle.

8. The device of claim 7 wherein said first and second tools of claim 1 have different dimensions.

9. A method of assembling a draw-bar assembly, the method comprising the steps of:
   (a) engaging the device of claim 1 with said hitchball and said draw-bar, and
   (b) threadedly engaging said nut with said shank,
   wherein said device holds said hitchball in fixed rotational position relative to said draw-bar.

* * * * *